United States Patent
Chen

[11] Patent Number: 6,147,615
[45] Date of Patent: Nov. 14, 2000

[54] SPEED DETECTING DEVICE FOR A DIRECT CURRENT MOTOR, AND ELECTRIC FAN WITH A MOTOR SPEED DETECTING DEVICE

[75] Inventor: Juin-Hung Chen, Taipei Hsien, Taiwan

[73] Assignee: Perfect Three Manufacturing Co., Taipei Hsien, Taiwan

[21] Appl. No.: 09/383,388

[22] Filed: Aug. 26, 1999

[51] Int. Cl.[7] .................................................. G08B 21/00
[52] U.S. Cl. .......................... 340/648; 340/635; 340/641; 318/434
[58] Field of Search .................................. 340/635, 641, 340/648; 318/434, 565, 254

[56] References Cited

U.S. PATENT DOCUMENTS

| 4,275,342 | 6/1981 | Kawada et al. | 340/648 |
|---|---|---|---|
| 5,880,678 | 3/1999 | Yu | 340/648 |
| 5,889,469 | 3/1999 | Mykytiuk et al. | 340/648 |
| 6,060,879 | 5/2000 | Mussenden | 340/648 |

*Primary Examiner*—Daniel J. Wu
*Attorney, Agent, or Firm*—Foley & Lardner

[57] ABSTRACT

A speed detecting device is adapted for use with a direct current motor, and includes a coupling circuit adapted to be connected electrically to a power input line of the motor, a one-shot circuit, a converter circuit, a comparator, and an alarm device. The one-shot circuit is triggered by a current-coupled pulse output, which is generated by the coupling circuit and which corresponds to current flowing through the power input line, and generates a pulse train signal in a form of a series of constant-width pulses, where spacing between adjacent ones of the constant-width pulses varies according to instantaneous operating speed of the motor. The converter circuit receives the pulse train signal, and generates a test signal having a magnitude that varies in accordance with the spacing between the adjacent ones of the constant-width pulses to provide an indication of a detected average operating speed of the motor. The comparator receives and compares the test signal with a predetermined reference signal that corresponds to a preset minimum operating speed of the motor, and generates an alarm activating signal when the test signal is less than the reference signal. The alarm device generates an alarm output upon receiving the alarm activating signal.

10 Claims, 4 Drawing Sheets

SPEED DETECTING DEVICE FOR A DIRECT CURRENT MOTOR, AND ELECTRIC FAN WITH A MOTOR SPEED DETECTING DEVICE

BACKGROUND OF THE INVENTION

1. Field of the Invention

The invention relates to a speed detecting device for a direct current motor, and to an electric fan with a motor speed detecting device.

2. Description of the Related Art

At present, an electric fan is used in electrical instruments and equipment, such as computers, for dissipating heat to ensure a normal operation thereof. Since a motor of the electric fan deteriorates after being in use for a period of time, the heat dissipating efficiency is reduced and can cause damage to electrical instruments and equipment. Therefore, it is necessary to detect the motor speed of the electric fan. Optical coupled and magnetic field detection techniques are two conventional techniques for speed detection of a direct current motor. The drawbacks of those techniques reside in that the motor must be redesigned and that the components for accomplishing speed detection are relatively expensive.

SUMMARY OF THE INVENTION

Therefore, the main object of the present invention is to provide a relatively low cost speed detecting device for a direct current motor which does not require modifications in the motor configuration.

Another object of the present invention is to provide an electric fan that incorporates the aforesaid speed detecting device.

According to one aspect of the present invention, a speed detecting device is adapted for use with a direct current motor, and includes a coupling circuit, a one-shot circuit, a converter circuit, a comparator and an alarm device.

The coupling circuit is adapted to be connected electrically to a power input line of the motor and to generate a current-coupled pulse output that corresponds to current flowing through the power input line.

The one-shot circuit is connected electrically to the coupling circuit so as to receive the current-coupled pulse output therefrom. The one-shot circuit is triggered by the current-coupled pulse output to generate a pulse train signal in a form of a series of constant-width pulses, where spacing between adjacent ones of the constant-width pulses varies according to instantaneous operating speed of the motor.

The converter circuit is connected electrically to the one-shot circuit so as to receive the pulse train signal therefrom. The converter circuit generates a test signal having a magnitude that varies in accordance with the spacing between the adjacent ones of the constant-width pulses to provide an indication of a detected average operating speed of the motor.

The comparator is connected electrically to the converter circuit so as to receive the test signal therefrom. The comparator compares the test signal with a predetermined reference signal that corresponds to a preset minimum operating speed of the motor, and generates an alarm activating signal when the test signal is less than the reference signal.

The alarm device is connected electrically to the comparator for generating an alarm output upon receiving the alarm activating signal from the comparator.

According to another aspect of the present invention, an electrical fan includes a direct current motor having a power input line adapted to be connected electrically to a power source, a fan impeller mounted on the motor and driven rotatably thereby, and the aforesaid speed detecting device for detecting the operating speed of the motor.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
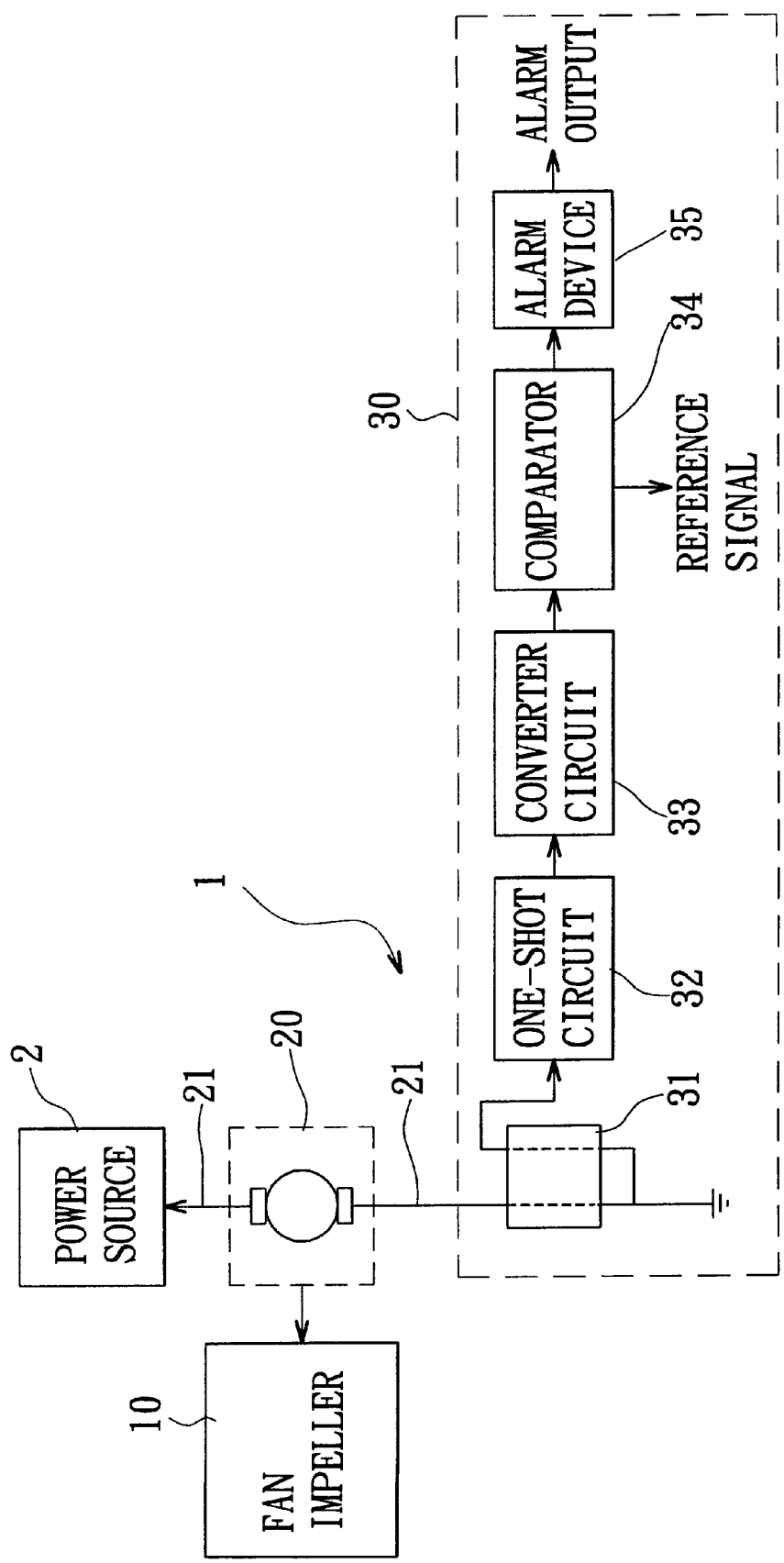
FIG. 1 is a schematic circuit block diagram illustrating the preferred embodiment of an electric fan according to the present invention.
Figure 2:
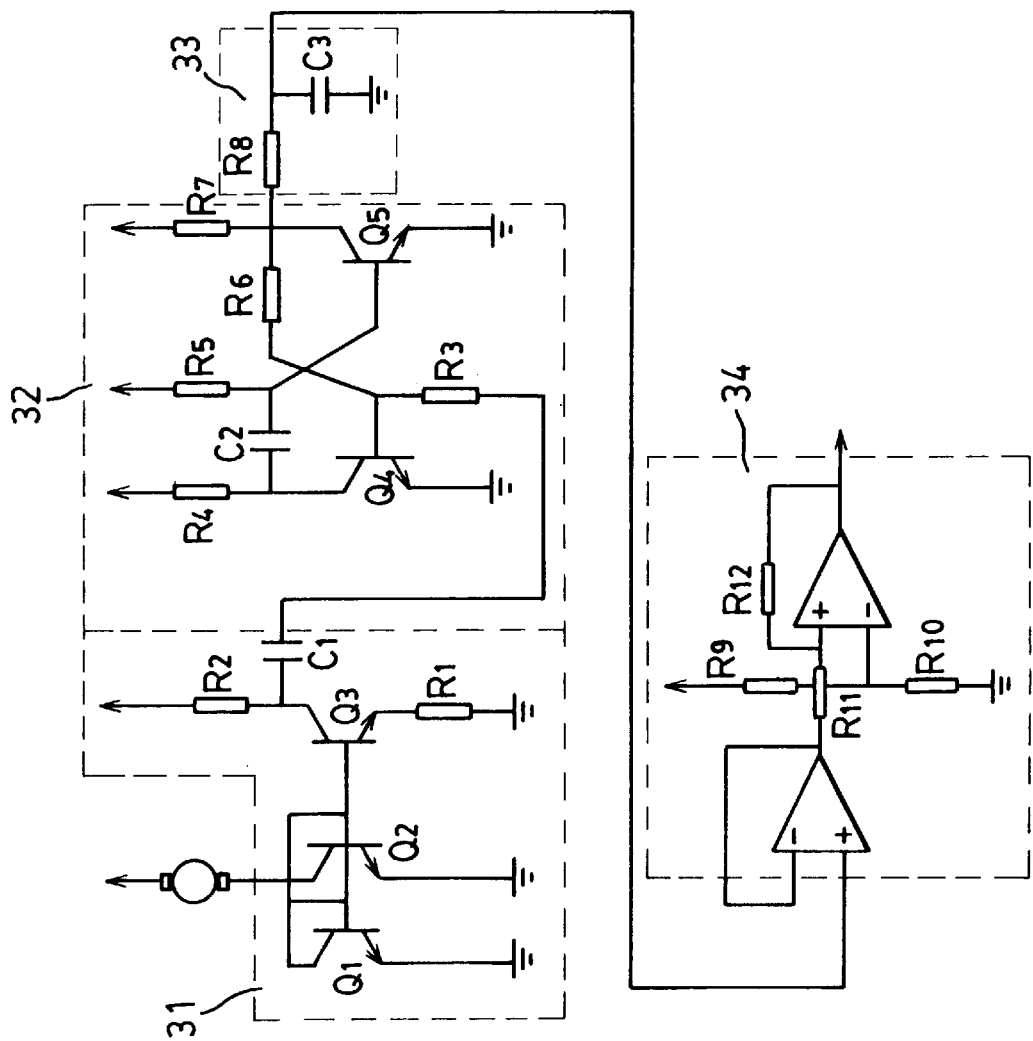
FIG. 2 is a schematic electrical circuit diagram illustrating a motor speed detecting device of the preferred embodiment.
Figure 3:
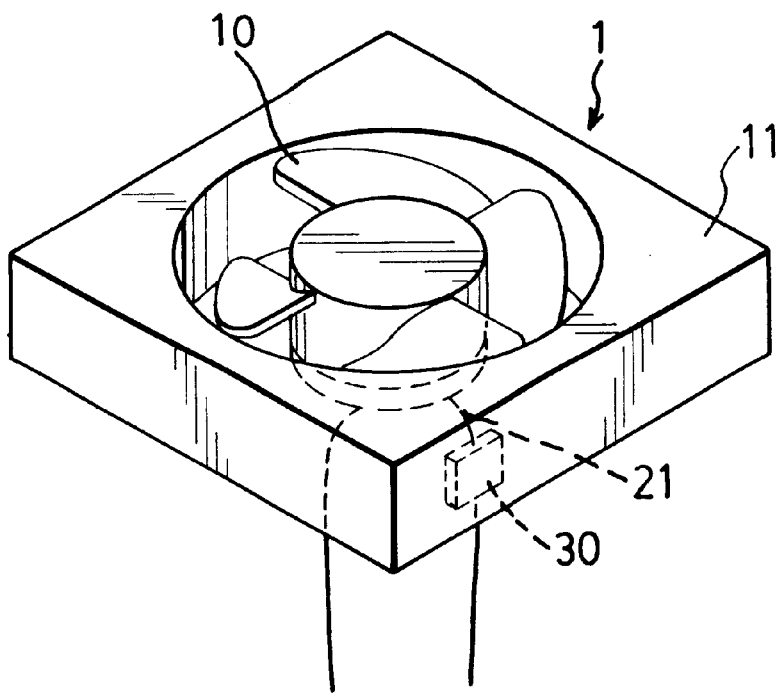
FIG. 3 is a perspective view of the electric fan of the preferred embodiment.

Referring to FIGS. 1 to 3, according to the preferred embodiment of this invention, an electrical fan 1 is shown to include a direct current motor 20 having a power input line 21 adapted to be connected electrically to a power source 2, a fan impeller 10 mounted on the motor and driven rotatably thereby, and a motor speed detecting device 30.

Figure 4:
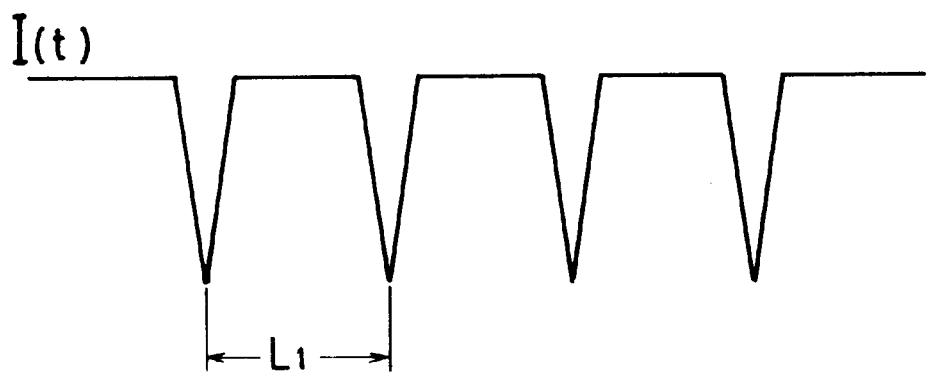
FIG. 4 is a signal diagram illustrating the current I(t) flowing through a motor of the electric fan.

As shown in FIG. 4, current I(t) flowing through the power input line 21 of the motor 20, which may or may not brushless, has a series of negative spikes, as is known in the art.

The motor speed detecting device 30, which can be installed internally or externally of the fan housing 11, as shown in FIG. 3), includes a coupling circuit 31, a one-shot circuit 32, a converter circuit 33, a comparator 34 and a alarm device 35.

The coupling circuit 31 is adapted to be connected in series with the power input line 21 of the motor 20. The coupling circuit 31 consists of three transistors $Q_1$, $Q_2$, $Q_3$, two resistors $R_1$, $R_2$, and a capacitor $C_1$, and generates a current-coupled pulse output that corresponds to the current I(t) (see FIG. 4) flowing through the power input line 21.

Figure 5:
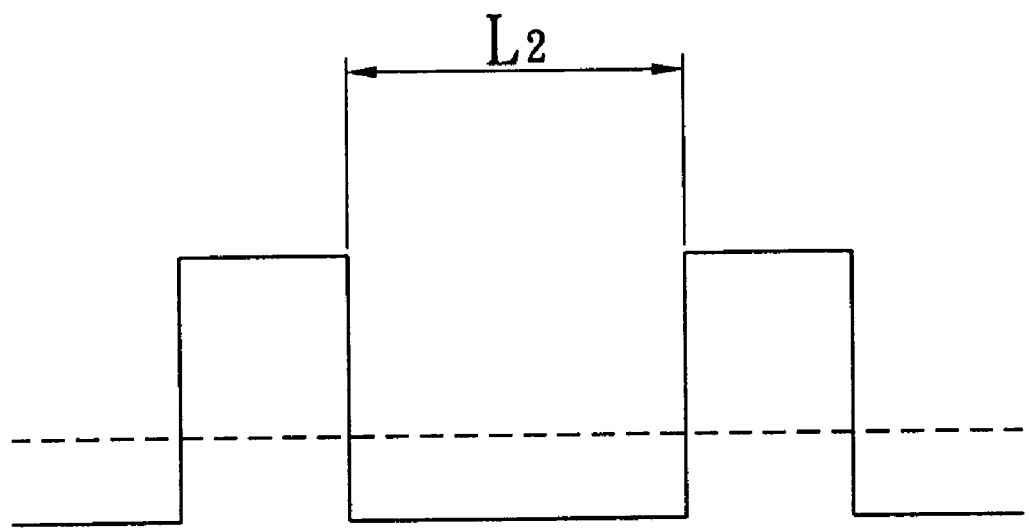
FIG. 5 is a signal diagram illustrating the pulse train signal generated by a one-shot circuit of the preferred embodiment.

The one-shot circuit 32 is connected electrically to the coupling circuit 31 so as to receive the current-coupled pulse output therefrom. The one-shot circuit 32, which consists of two transistors $Q_4$, $Q_5$, five resistors $R_3$, $R_4$, $R_5$, $R_6$, $R_7$, and a capacitor $C_2$, is triggered by the current-coupled pulse output to generate a pulse train signal (see FIG. 5) in a form of a series of constant-width pulses. A spacing ($L_2$) between adjacent ones of the constant-width pulses varies according to the instantaneous operating speed of the motor 20. In other words, when the motor 20 has a higher operating speed, the spacing ($L_2$) between adjacent pulses of the pulse train signal becomes smaller so as to result in higher average voltage for the pulse train signal.

The converter circuit 33 is connected electrically to the one-shot circuit 32 so as to receive the pulse train signal therefrom. The converter circuit 33 generates a test signal having a magnitude that varies in accordance with the spacing ($L_2$) between the adjacent ones of the constant-width pulses to provide an indication of a detected average operating speed of the motor 20. In this embodiment, the converter circuit 33 includes a charge-discharge circuit consisting of a resistor $R_8$ and a capacitor $C_3$. The test signal is an analog voltage signal, the amplitude of which varies in accordance with the spacing ($L_2$) between the adjacent ones of the constant-width pulses of the pulse train signal. In another embodiment, the test signal is a digital signal generated by a converter circuit that consists of a counter (not shown). The output of the counter varies in accordance with the spacing ($L_2$) between the adjacent ones of the constant-width pulses of the pulse train signal.

The comparator 34 is connected electrically to the converter circuit 33 so as to receive the test signal therefrom. The comparator 34, which consists of two operational amplifiers $A_1$, $A_2$ and four resistors $R_9$, $R_{10}$, $R_{11}$, $R_{12}$, compares the test signal with a predetermined reference signal that corresponds to a preset minimum operating speed of the motor 20, and generates an alarm activating signal when the test signal is less than the reference signal.

The alarm device 35, such as a buzzer or a light-emitting device, is connected electrically to the comparator 34 for generating an alarm output upon receiving the alarm activating signal from the comparator 34.

Accordingly, when the motor 20 deteriorates so as to have a lower operating speed after being in use for a relatively long period of time, the distance ($L_1$) between adjacent ones of the negative spikes of the current I(t) (see FIG. 4) flowing through the power input line 21 becomes longer, thereby resulting in a wider the spacing ($L_2$) between adjacent ones of the constant-width pulses of the pulse train signal and in a lower amplitude of the test signal. When the test signal is less than the reference signal, the comparator 34 provides the alarm activating signal to the alarm device 35, which subsequently generates the alarm output to alter the user that the motor 20 should be replaced or repaired.

In aforesaid speed detecting device 30, the motor 20 need not be modified to include expensive components for speed detection. The objects of the invention are thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A speed detecting device for a direct current motor, comprising:
   a coupling circuit adapted to be connected electrically to a power input line of the motor and to generate a current-coupled pulse output that corresponds to current flowing through the power input line;
   a one-shot circuit connected electrically to said coupling circuit so as to receive the current-coupled pulse output therefrom, said one-shot circuit being triggered by the current-coupled pulse output to generate a pulse train signal in a form of a series of constant-width pulses, where spacing between adjacent ones of the constant-width pulses varies according to instantaneous operating speed of the motor;
   a converter circuit connected electrically to said one-shot circuit so as to receive the pulse train signal therefrom, said converter circuit generating a test signal having a magnitude that varies in accordance with the spacing between the adjacent ones of the constant-width pulses to provide an indication of a detected average operating speed of the motor;
   a comparator connected electrically to said converter circuit so as to receive the test signal therefrom, said comparator comparing the test signal with a predetermined reference signal that corresponds to a preset minimum operating speed of the motor, and generating an alarm activating signal when the test signal is less than the reference signal; and
   an alarm device connected electrically to said comparator for generating an alarm output upon receiving the alarm activating signal from said comparator.

2. The speed detecting device as claimed in claim 1, wherein the test signal is an analog signal, the amplitude of which varies in accordance with the spacing between the adjacent ones of the constant-width pulses of the pulse train signal.

3. The speed detecting device as claimed in claim 2, wherein said converter circuit includes a charge-discharge circuit.

4. The speed detecting device as claimed in claim 1, wherein said alarm device is a buzzer.

5. The rotary detecting device as claimed in claim 1, wherein said alarm device is a light-emitting device.

6. An electric fan comprising:
   a direct current motor having a power input line adapted to be connected electrically to a power source;
   a fan impeller mounted on said motor and driven rotatably thereby; and
   a motor speed detecting device including
      a coupling circuit connected electrically to said power input line of said motor, said coupling circuit generating a current-coupled pulse output that corresponds to current flowing through said power input line,
      a one-shot circuit connected electrically to said coupling circuit so as to receive the current-coupled pulse output therefrom, said one-shot circuit being triggered by the current-coupled pulse output to generate a pulse train signal in a form of a series of constant-width pulses, where spacing between adjacent ones of the constant-width pulses varies according to instantaneous operating speed of said motor,
      a converter circuit connected electrically to said one-shot circuit so as to receive the pulse train signal therefrom, said converter circuit generating a test signal having a magnitude that varies in accordance with the spacing between the adjacent ones of the constant-width pulses to provide an indication of a detected average operating speed of said motor,
      a comparator connected electrically to said converter circuit so as to receive the test signal therefrom, said comparator comparing the test signal with a predetermined reference signal that corresponds to a preset minimum operating speed of said motor, and generating an alarm activating signal when the test signal is less than the reference signal, and
      an alarm device connected electrically to said comparator for generating an alarm output upon receiving the alarm activating signal from said comparator.

7. The electric fan as claimed in claim 6, wherein the test signal is an analog voltage signal, the amplitude of which varies in accordance with the spacing between the adjacent ones of the constant-width pulses of the pulse train signal.

8. The electric fan as claimed in claim 7, wherein said converter circuit includes a charge-discharge circuit.

9. The electric fan as claimed in claim 6, wherein said alarm device is a buzzer.

10. The electric fan as claimed in claim 6, wherein said alarm device is a light-emitting device.

* * * * *